Figure 1:
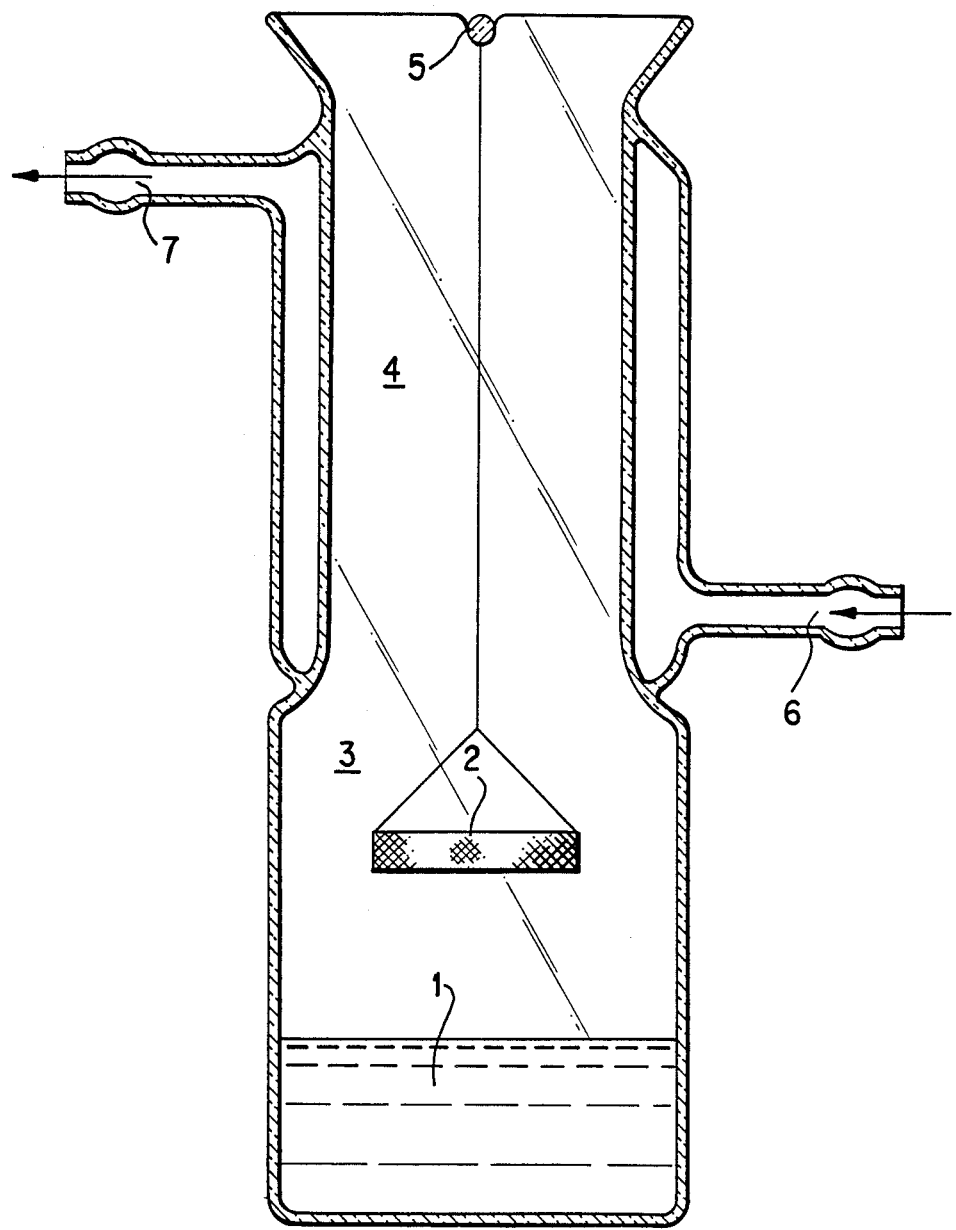

United States Patent [19]

Bargigia et al.

[11] Patent Number: 4,977,222
[45] Date of Patent: Dec. 11, 1990

[54] CROSS-LINKING OF THERMOSETTING RESINS BY MEANS OF HEATING WITH SATURATED PERFLUOROPOLYETHER VAPOR IN THE PRESENCE OF A SECONDARY FLUID

[75] Inventors: Gianangelo Bargigia; Alberto Re, both of Milan; Luigi Corbelli, Ferrara, all of Italy; Ken Johns, Ashford, Great Britain; Luciano Flabbi; Padmanabhan Srinivasan, both of Milan, Italy

[73] Assignee: Ausimont S.p.A., Italy

[21] Appl. No.: 167,125

[22] Filed: Mar. 11, 1988

[30] Foreign Application Priority Data

Mar. 16, 1987 [IT]   Italy ............................... 19709 A/87
Sep. 22, 1987 [IT]   Italy ............................... 41010 A/87

[51] Int. Cl.$^5$ .............................................. C08F 8/20
[52] U.S. Cl. ............................. 525/359.3; 525/326.4; 525/329.7; 525/330.3; 525/331.7; 525/333.7; 525/447; 525/453; 525/460; 525/480; 525/509; 525/523; 528/481; 528/483

[58] Field of Search ..................... 525/359.3, 447, 453, 525/460, 480, 509, 523; 528/481, 483

[56] References Cited

U.S. PATENT DOCUMENTS 4,563,394  1/1986  Ishikawa .......................... 525/359.3
4,810,760  3/1989  Strepparola et al. ............ 525/359.3

FOREIGN PATENT DOCUMENTS 59-219813  6/1984  Japan .

*Primary Examiner*—Bernard Lipman
*Attorney, Agent, or Firm*—Morgan & Finnegan

[57] ABSTRACT

The cross-linking or curing of thermosetting resins and of hot curable elastomers is carried out by heating the material or the article comprising the resin (or the elastomer) by saturated vapor of the commercial perfluoropolyether having an average boiling point corresponding to the temperature necessary for the cross-linking and having a point range not exceeding 12° C. (measured according to ASTM D 1078) in the presence of a chlorofluorohydrocarbon secondary vapor.

4 Claims, 1 Drawing Sheet

CROSS-LINKING OF THERMOSETTING RESINS BY MEANS OF HEATING WITH SATURATED PERFLUOROPOLYETHER VAPOR IN THE PRESENCE OF A SECONDARY FLUID

Cross-linking of thermosetting resins such as for example epoxy resin is carried out by supplying heat to the material to be cross-linked and it can be effected by using a hot air stream, infrared radiations or by means of heat transmission through heating surfaces. An improvement of the thermal cross-linking technique has been newly achieved through the method disclosed in U.S. Pat. No. 4,517,356 (to Lambert), according to which the cross-linking is effected by immerging the material to be cross-linked into a saturated vapour generated by a liquid maintained under boiling in a proper apparatus. In comparison with the preceding methods based on other heating systems, this method offers a substantial advantage due to the drastic reduction of the heat-treatment times along with a high uniformity of the temperature in every point of the material to be cross-linked and with a perfect control of the temperature.

The optimization of the operative conditions as regards the thermal aspect permits furthermore to obtain cross-linked products having improved characteristics also with respect to other known methods, in which the heating times are much longer and/or the temperature control and uniformity are low. Said patent, which in general proposes the use of liquids having a boiling point higher than 100° C., specifically proposes and exemplifies the use of only two liquid compounds marketed by Minnesota Mining Manufacturing under the trademark Fluorinert FE43 and FC75, respectively. They are perfluorinated compounds having a boiling point respectively of 174° C. and 102° C. and are, respectively, perfluorotrialkylamine and cyclic perfluoroether.

However, the possibilities of utilizing this thermal cross-linking process are depending on the availability of liquid products endowed with the necessary properties.

In fact, not all the liquid products with boiling point higher than 100° C., as is generically proposed by said patent, are suited to the purpose: to be discarded are, of course, all the liquid products which react or are anyhow incompatible with the resin (for example those having a solubilizing effect, a swelling affect), the ones having a low heat resistance or a low resistance to air oxidation at the temperature of use, the ones which are inflammable, such as toluene, xylene, and the ones which are toxic, such as perchloroethylene having a TLV=50 ppm, or those which are irritant.

In practice, the indications of the patent under discussion and those of the later technical literature on the matter refer to few specific perfluorinated compounds.

The technicians skilled in the art were not yet offered the possibility of practising on a large scale the cross-linking method based on heating by means of saturated vapor because, due to the different temperatures required by the different types of resins and by the different processing methods, in particular as regards the temperatures considerably exceeding 100° C., the suitable liquid specifically indicated and proposed are only the two cited in U.S. Pat. No. 4,517,356 to Lambert, which are not sufficient to adequately cover a vast processing temperature range.

To obviate the lack of single products having the desired boiling point, the cited patent under discussion suggests the use of mixtures of the two mentioned products in various ratios, thereby covering the temperature range from 102° to 175° C. However, the use of mixture of two compounds having remarkably different boiling points gives in practice unsatisfactory results.

In fact during the use, while boiling, the mixture tends to lose, in the form of vapor, preferably the lower boiling component, as later pointed out by the inventor himself in an article in Electronique Tech. Ind. (1984), No. 4, pages 73 to 78. This results in a continuous, progressive variation in the composition of the liquid and, by consequence, in the boiling temperature. Furthermore, it should be borne in mind that, on the basis of well known chemico-physical laws, when a mixture of the products having remarkably different boiling points (as in the case of the above-cited products FC 43 and FC 75) is brought to boiling, different equilibrium temperatures in the liquid and in the vapor are obtained and, in the latter, a temperature gradient establishes between the surface of the boiling liquid and the one of vapor condensation, wherefore the temperature in the vapor phase varies from area to area. This makes difficult to fix the operative parameters of cross-linking, what practically results in the non-operability of the process based on the use of two or more compounds having different boiling points. Furthermore, the losses due to an incomplete condensation of the vapor and to the outflowing of same from the apparatus are higher—the working temperature being equal—in the case of a heterogeneous mixture, owing to the presence of the remarkedly lower-boiling component, than the losses resulting in the case of a pure compound having the same boiling point.

The object of the present invention is to obviate the above-mentioned drawbacks by using, as a working fluid, industrial-type perfluoropolyethers, consisting of mixtures of chemical individuals similar to one another but having different molecular weights and physical properties, in particular the boiling point, very similar and comprised in a narrow range. In fact, the industrial products are obtained from the synthesis processes as a continuous aggregate of chemical individuals having an increasing molecular weight (and boiling point). From a practical viewpoint it would be impossible, at least in the economical respect, to isolate the single chemical individuals.

The working fluid losses are very low, after long operating times, however in order to further minimize said losses it was found that the use of a secondary fluid of the type of chlorofluorohydrocarbon was effective.

Secondary fluids of said type are used in the batch apparatus for the vapor-phase soldering, but were never used before for cross-linking thermosetting resins or polymer thick films.

This is due to the fact that, unlike what happens in the vapour-phase soldering process, the use of a secondary fluid, in particular a halogenated hydrocarbon, may cause a swelling or a partial solubilization of the resin during cross-linking.

It is known that the thermosetting resins are stable, after cross-linking, to the halogenated hydrocarbon solvent, but an analogous behaviour of the resin during the cross-linking step could not be expected.

It has surprisingly been found that the use of a secondary fluid does not affect the quality of the resin in course of cross-linking and makes possible a reduction in the losses of the primary perfluoropolyethereal vapor.

At any rate it is not known whether the unexpected quality of the cured resin and of the polymer thick film is depending on the stability of the resin in course of curing in contact with the secondary fluid vapor or rather on the fact that the curing times are so rapid as to prevent the supposed possible dissolving effect of the secondary vapor.

In order to minimize the possible dissolving effect of the secondary fluid it is advisable to minimize (to a few seconds) the residence time of the resin to be cross-linked in the secondary vapor area prior to the cross-linking step.

This can be achieved by raising the down-stroke speed of the truck containing the resin to be cured, consistently with the operative requirements, as is described in the examples (5 cm/sec.).

Thus, a further object of the present invention is a process for cross-linking thermosetting resins or hot curable elastomers or polymer thick films, carried out by heating the material or the article containing the resin, the elastomer or the polymer thick film by means of saturated vapor of a perfluoropolyether having a perfluoroalkyl end group and an average boiling point ranging from 120° to 270° C. (primary fluid) and corresponding to the temperature necessary for the cross-linking, said process being furthermore characterized by the presence of a secondary vapor, which has the purpose to limit the primary fluid losses due to evaporation, said secondary fluid being a fluorinated compound of the fluorochlorohydrocarbon type.

With a view to obviating the shortcomings of the cited prior art there are utilized, as a primary fluid, the industrial-type perfluoropolyethers, cited above.

The industrially obtainable perfluoropolyethers (primary fluid) represent a series of chemically similar products with boiling points from 80° to 280° C. and above.

Each product consists of a mixture of chemically similar individual compounds: due to the presence of fractions which are substantially more volatile than the average, the mixture, in general, does not meet the requirement of maintaining a constant boiling point for the entire duration of a process in which it is used as a heating fluid in the form of saturated vapor supplied by the same mixture maintained under boiling.

However, it has surprisingly been found that the fractions having a boiling range $\leq 12°$ C., preferably $\leq 10°$ C. (determined by method ASTM D 1078) exhibit, in the use in question, a variation of the vapor condensation temperature comprised in a narrow range of the order of 2°–3° C. even after a 500-hour operation. Such a variation is fully acceptable in the practical respect.

Suitable products according to the present invention are the industrial-type products having structure of perfluoropolyethers, with neutral end groups, i.e. perfluoroalkyl groups, having a boiling point ranging from 120° to 270° C., preferably from 140° to 240° C., with a boiling range within the abovesaid limits.

Said products belong to the following classes of perfluoropolyethers comprising the constituting units of the type indicated hereinbelow:

(1) $(C_3F_6O)$ and $(CFXO)$ statistically distributed along the perfluoropolyether chain, wherein X is equal to $-F$, $-CF_3$;

(2) $(C_3F_6O)$, (3) $(C_3F_6O)$, this class comprises also the characteristic group $-CF(CF_3)-CF(CF_3)$;

(4) $(C_3F_6O)$, $(C_2F_4O)$, $(CFXO)$ statistically distributed along the perfluoropolyether chain, wherein X is equal to $-F$, $-CF_3$;

(5) $(C_2F_4O)$, $(CF_2O)$ statistically distributed along the perfluoropolyether chain;

(6) $(C_2F_4O)$;

(7) $(CXYCF_2CF_2O)$, where X and Y, like or different from each other, are H or F;

(8)

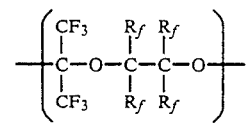

where $R_f$ is F or a perfluoroalchyl.

The perfluoroethereal compounds containing the indicated units are preferably selected, for example, from the following classes:

(1) $A'O(C_3F_6O)_m(CFXO)_n-A$,
where
X is equal to $-F$, $-CF_3$; A and A', like or different from each other, may be $-CF_3$, $-C_2F_5$, $-C_3F_7$;
units $C_3F_6O$ and $CFXO$ are statistically distributed along the perfluoropolyether chain, m and n are integers such that the boiling point is in the above-specified range;
n can be equal to 0 and the m/n ratio is equal to 2 when n is different from 0.
These perfluoropolyethers are obtained by photo-oxidation of hexafluoropropene according to the process described in GB Pat. No. 1,104,482, and subsequent conversion of the end groups to chemically inert groups, in accordance with the description in GB Pat. No. 1,226,566.

(2) $C_3F_7O(C_3F_6O)_m-B$,
wherein
B can be $-C_2F_5$, $C_3F_7$, and m is a positive integer and such that the boiling point is in the abovesaid range. These products are obtained by ionic telomerization of the hexafluoropropene epoxide and subsequent treatment of the acid fluoride with fluorine, according to the processes described in U.S. Pat. No. 3,242,218.

(3) $C_3F_7O(C_3F_6O)_m-CF(CF_3)-_2$,
wherein
m is a positive integer, such that the product's boiling point is in the above-indicated range.
These products are obtained by ionic oligomerization of the hexafluoropropene epoxide and subsequent photochemical dimerization of the acid fluoride according to processes described in U.S. Pat. No. 3,214,478.

(4) $A'O(C_3F_6O)_m(C_2F_4O)_n(CFXO)_q-CF_3A$,
wherein
A and A', either the same or different from each other, can be $-CF_3$, $-C_2F_5$, $-C_3F_7$; X is equal to $-F$, $-CF_3$; m, n and q are integers and can also be zero, but at any rate they must be such that the boiling point may be in the above-indicated range.
These products are obtained by photo-oxidation of mixtures of $C_3F_6$ and $C_2F_4$ and by subsequent treatment with fluorine according to the process described in U.S. Pat. No. 3,665,041.

(5) $CF_3O(C_2F_4O)_p(CF_2O)_q-CF_3$,
   wherein
   p and q are integers either like or different from each other, in which the p/q ratio ranges from 0.5 to 2, and are such that their boiling point is in the above-specified range.

These perfluoropolyethers are prepared according to the method described in U.S. Pat. No. 3,715,378, and are then treated with fluorine according to U.S. Pat. No. 3,665,041.

(6) $A-(CF_2CF_2)_n-A'$,
   wherein
   A and A', like or different from each other, can be $-CF_3$, $-C_2F_5$, and n is such a positive integer that the boiling point is in the above-indicated range.

These perfluoropolyethers are prepared according to the process described in U.S. Pat. No. 4,523,039.

(7) $A-(CXYCF_2CF_2)_m-A'$,
   wherein
   A and A', like or different from each other, can be $-CF_3$, $-C_2F_5$, $-C_3F_7$; X and Y are H or F, either like or different from each other, and m is an integer such that the boiling point of the product is in the above-indicated range.

These perfluoropolyethers are prepared according to the process described in European patent application EP No. 148,482.

(8)

$$R_f'-\left(\begin{array}{ccc} CF_3 & R_f & R_f \\ | & | & | \\ C-O-C-C-O \\ | & | & | \\ CF_3 & R_f & R_f \end{array}\right)_n-R_f'$$

wherein
$R'_f$ is a perfluoroalkyl, n is at least 8, $R_f$ is F or a perfluoroalkyl. These perfluoropolyethers are described in patent application PCT WO No. 87/00538.

The primary perfluoropolyethereal fluid of the type defined hereinabove, belonging to the indicated classes of compounds, have proved to be particularly suited to effect the cross-linking, by the method of the present invention, of all the main thermosetting resins, for example epoxy resins, unsaturated polyester resins, urethanic resins, acrylic resins, phenolic resins, alkyd melanic resins. In particular, phenol resins, alkyl melaminic resins and polymer thick films have been used. Furthermore the primary PFPE fluid is fit for processes for the curing of elastomers such as ethylene/propylene copolymer, ethylene/propylene/diene terpolymer, vinylidene fluoride/hexafluoropropene copolymer and terpolymer $CH_2=CF_2/C_3F_6/C_2F_4$. In fact, the perfluoropolyethers defined hereinabove have proved to be fully compatible with the above-indicated resins and elastomers and do not give rise to drawbacks such as dissolution, swelling, gelling or other physical or chemical interactions with the resins during the curing process. Important technical progresses are achieved in particular in the cross-linking of EPR and EPDM elastomers, which is usually carried out in molten salts baths.

It is known in fact that the thermostability of these elastomers is not particularly high at the cross-linking temperature (200°-230° C.).

If the vapor-phase technique is adopted, the maximum cross-linking degree is reached in short times; when the hot treatment is carried out longer than necessary in vapour and as long as necessary in the molten salts, a begin of decay of the rubber mechanical characteristics can be observed.

It is therefrom inferable that in the molten-salts treatment the last cross-linking step takes place concurrently with degradation, wherefore, whichever the duration of the treatment in molten salts may be, it will be never possible to obtain the optimum result.

It is known too that the use of molten salts rises pollution problems, the solution of which involves considerable investment costs.

The perfluoropolyethers according to the present invention are also suitable for curing epoxy, phenol and melaminic resins containing finely dispersed metals, which, once they are applied according to a certain tracing onto proper substrates, form, further to cross-linking, conductive paths between electronic components of an integrated circuit.

The resistivity values obtained in this case are lower not only than those obtainable by means of heating in an air-circulation oven, but also than those obtained when the substrates are placed on plates which are heated to the cross-linking temperature. This applies also to the case when the substrate is made of alumina and the metal-filled resin layer is very thin.

The perfluoropolyethers conforming to the present invention are capable of cross-linking the epoxy resins much better than it is possible in oven at the same temperatures, as is apparent both from the glass transition temperature value (which is higher in the case of a better cross-linking) and from the higher adhesion that they impart to metal elements caused to adhere by means of the abovesaid resins.

Furthermore, the perfluoropolyethers exhibit to a high degree the following properties which are essential for the curing process according to the invention:
ininflammability,
stability to high temperatures,
good heat transmission coefficient,
chemical inertia.

As a secondary fluid it is possible to utilize any halogenated fluid, preferably of the type of the fluorochlorohydrocarbons, in particular trichlorotrifluoroethane (DELIFRENE HP ®).

The apparatus for practising the process of the present invention comprising the use of the secondary fluid, consists of a stainless steel tub equipped, on the bottom, with electrical heating elements and, at a certain height, with cooling coils; furthermore, it is equipped with a thermocoupled for taking the temperatures and with a suction device for removing the volatilizing vapors.

Said apparatus is also equipped with a secondary fluid injection system for removing the primary fluid vapors, as well as with a basket containing the article to be cross-linked, which can be brought into contact with the primary operative fluid in very short times.

For comparative purposes, an apparatus-represented in the figure- not equipped with the secondary vapor injection system was utilized.

In the FIG., (1) designates the boiling liquid (2) the containing basket, (3) the vapor area, (4) the cooling area, (5) the glass support, (6) the cooling water inlet, (7) the cooling water outlet.

The following examples are given merely to illustrate the present invention without being however a limitation thereof.

EXAMPLE 1

Two perfluorinated fluids having an average boiling point respectively of 177° C. (perfluoro-trialkylamine RM 175 produced by RIMAR) and of 102° C. (cyclic perfluoroether RM 100 produced by RIMAR) were mixed in order to obtain a mixture, which was introduced into a Pyrex flask having a volume of 100 ml, connected with a reflux cooler by means of a glass connector, equipped with a thermometer plunging into the liquid and with a thermometer in the equilibrium vapor, arranged 8 cm above the liquid surface. The mixture, brought to boiling, exhibited a temperature of 168° C. (liquid) and of 156° C. (vapor).

For comparative purposes, a perfluoropolyether mixture known under the trade-mark Galden (Montedison), of general formula:

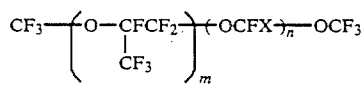

where X=F, $CF_3$ was examined, such mixture having—according to standard ASTM D 1078—a distillation range from 154.5° to 160° C. and exhibiting, after having brought to boiling in the same flask described hereabove, temperatures of 150° C. (liquid) and 156° C. (vapor).

Operating exactly under the same conditions, 160 g of each mixture were brought to boiling in a 200-ml flask and were allowed to boil until a loss of fluid equal to 32 g from each flask was determined.

At the end, the temperatures of the liquid and of the vapor under boiling conditions were measured again in the same flask: such temperatures were equal respectively to 178° and 171° C. for the perfluorotrialkylamine/cyclic perfluoroether mixture and respectively to 158° and 156° C. for the perfluoropolyethers.

In the latter case, as is apparent, no variations occurred.

EXAMPLE 2

Following the procedure of example 1, a perfluorotrialkylamine/cyclic perfluoroether mixture (A) was prepared, which, on boiling, had temperatures of 164.5° and 150° C. respectively of the liquid and of the vapor. Said mixture was compared with perfluoropolyethers having the same general formula as in example 1 and characterized by a distillation range from 146° to 154.5° and liquid/vapor equilibrium temperatures of 152° and 150° C., respectively.

150 g of each fluid being tested were brought to boiling in a 300-ml flask heated in a thermostatic liquid maintained by 30° C. above the temperature of the boiling liquid (194.5° and 182° C. respectively).

After 1 hour the following losses were determined: 10.5% for the perfluorotrialkylamine/cyclic perfluoroether mixture and 2.8% for the perfluoropolyethers.

EXAMPLE 2A

The test was repeated using mixture A of the preceding example, but raising the temperature of the thermostat in order to have always a difference of 30° C. between its temperature and the boiling liquid temperature: after 1 hour a loss of 13% was determined.

EXAMPLE 2B

Following the modalities of example 2A and using, as a fluid, perfluoropolyethers of general formula:

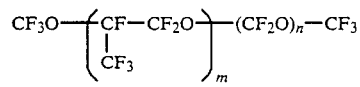

with a distillation range of 151°-157.5° C. and with liquid/vapor equilibrium temperatures of 155° C. and 153° C. respectively, a loss of 0.75% was determined after 1 hour.

EXAMPLE 3

Into the tub of a IVP apparatus (U.K.) made of stainless steel and equipped, on the bottom, with electric heating elements and, at the top, with cooling coils and equipped also with a thermocouple for taking the temperatures and with a device to suck the volatilizing vapors, there were introduced 10 l of perfluoropolyether GALDEN (Montedison) having formula:

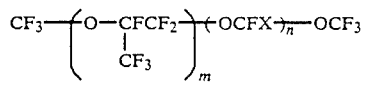

where X=F, $CF_3$ characterized by a viscosity of 4.0 cst at 20° C. and a distillation range of 213°-219° C. (according to standard ASTM D 1078). It was brought to boiling.

At the beginning, the temperature of the vapors was of 215° C. After 120 hours, to make up for the product losses, about 1.8 liters of the same fluid were added and, after additional 120 hours, about 1.7 liters were added.

Boiling was carried on for total 475 hours. On conclusion, the temperature of the vapors was of 217° C. The total losses amounted to 12.6 kg, corresponding to 25.6 g/hour.

At the end of the test, the characteristics of the fluid were: viscosity at 20° C.=4.2 cst.; distillation range=214°-221° C.

EXAMPLE 4

Two parallel self-adhesive, about 0.15 mm thick tapes were applied, at a 5 mm distance from each other, on alumina substrates measuring 25×30 mm and having thickness of 0.6 mm.

Between them, two-component resin Epotek H20 (containing Ag in the form of a finely dispersed powder) was deposited in order to form an exactly defined path. Prior to application onto the board, the resin was maintained under vacuum at room temperature to remove the volatile matters, thereby preventing defects due to the forming of blisters, which would render unreliable the values measured after curing.

The adhesive tapes were removed and the resin was cross-linked both in oven and in condensing vapor, as is specified hereinbelow.

Performed were two series of tests, during which the boards were heated in oven on heating plates to 160° C. and in perfluoropolyethers vapor (at 160° C.), characterized by a distillation range of 158°-167° C. and having the structure indicated in example 1, using the apparatus represented in the figure, wherein (1) designates the boiling liquid, (2) the containing basket, (3) the vapor area, (4) the cooling area, (5) the glass support, (6) the cooling water inlet, (7) the cooling water outlet.

The results are recorded in the tables.

The volumetric resistivity was measured according to method Thiedig Milli-T0.2 in a cell properly constructed on the basis of method UNI 5608 (Kelvin type measuring method with 4 electrodes), after having accurately measured the dimensions of the path by means of a digital micrometer and a graduated optical monitor.

| Heating time | Resistivity (ohm × cm.) | |
|---|---|---|
| | oven | vapor |
| 2' | $1,80.10^{-4}$ | $1,28.10^{-4}$ |
| 1' 30" | no polym. | $1,29.10^{-4}$ |
| 0' 45" | no polym. | $1,30.10^{-4}$ |

COMPARATIVE TEST

In the apparatus schematically represented in the figure, DMF (dimethylformamide, b.p.=153° C.) was brought to boiling.

A substrate prepared as described above was placed in the vapor area and left there for 1 minute. Dissolution of the resin was observed. The Ag path remained on the substrate, however it did not adhere to the substrate and crumbled very easily.

EXAMPLE 5

The test of example 4 was repeated, except that heating to 160° C. occurred in an air circulation oven. The resistivity values were measured as already described and are reported in the table.

| Heating time | Resistivity (ohm × cm.) | |
|---|---|---|
| | oven | vapor |
| 8' | $8,73.10^{-4}$ | |
| 4' | no polym. | $1,24.10^{-4}$ |
| 1' 30" | no polym. | $1,29.10^{-4}$ |
| 0' 45" | no polym. | $1,30.10^{-4}$ |

EXAMPLE 6

By heating in an air circulation oven for 1 hour to 100° C. a mixture of
100 parts by weight of epoxy resin Epikote 828 ®
90 parts by weight of methyl endomethylene tetrahydrophthalic anhydride (methyl "nadic" anhydride)
1 part by weight of N-butyl imidazole the corresponding prepolymer in solid form was prepared.

In two series of parallel tests the prepolymer was heated for different times both in an air circulation oven and in Galden vapors, respectively to 165° and to 215° C.

Galden vapors were characterized by distillation ranges respectively of 160°–168° C. and 213°–219° C. and were utilized in the apparatus of example 3.

By means of a Perkin Elmer DSC-4 calorimeter and employing a heating rate of 16° C./minute, in scanning I and II there were measured the glass transition temperatures, which are reported in the table.

| Heating time min. | Heating to 165° C. | | | | Heating to 215° C. | | | |
|---|---|---|---|---|---|---|---|---|
| | oven | | vapor | | oven | | vapor | |
| | I scan. | II scan. | I scan. | II scan. | I scan. | II scan. | I scan. | II scan. |
| 1 | — | — | 53 | 48 | 60 | 45 | 117 | 118 |
| 2 | — | — | 65 | 58 | — | — | — | — |
| 3 | 53 | 46 | 68 | 69 | 67 | 75 | 124 | 127 |
| 5 | 65 | 66 | 72 | 101 | 105 | 116 | 132 | 136 |
| 10 | 138 | 136 | 150 | 140 | — | — | — | — |

EXAMPLE 7

An EP copolymer based on $C_2H_4/C_3H_6$ (70–30%) known under the trade-mark DUtral ® Co 038 was utilized to prepare a mix having the following composition:

| | | |
|---|---|---|
| elastomer | 100 | parts by weight |
| carbon black FEF | 55 | parts by weight |
| paraffin oil | 30 | parts by weight |
| zinc oxide | 5 | parts by weight |
| stearic acid | 1 | parts by weight |
| cumyl peroxide | 1.5 | parts by weight |
| Trigonox 29/40 | 0.5 | parts by weight |
| sulphur | 0.3 | parts by weight |

This mix was extruded to a rectangular section test piece measuring 35×1.5 mm, and in the form of a complex section test piece having a diameter of about 20 mm.

Curing took place in the same apparatus and using the same perfluoropolyether as in example 3 and, for a comparison with the usual method, in a molten salts bath maintained at the same temperature.

In the latter case the extrudate, after withdrawal from the molten salts, was washed in a water bath in order to dissolve the salts still adhering to it. The maximum obtainable result was achieved in 20 seconds and in 65 seconds respectively when perfluoropolyether vapors and when molten salts were used.

The results are reported hereinbelow; the measurements were carried out according to standard ASTM D 412 (tensile stress, elongation at break, tension set) and to standard ASTM D. 2240 (hardness):

| RECTANGULAR SECTION TEST PIECE | | | | | | |
|---|---|---|---|---|---|---|
| time (sec.) | tensile stress (Kg/cm$^2$) | | elong. at break (%) | | tension set (%) | |
| | salts | vapor | salts | vapor | salts | vapor |
| 10 | no curing | 105 | no curing | 680 | no curing | 17 |
| 20 | 95 | 150 | 800 | 450 | 18 | 11 |
| 65 | 145 | 145 | 480 | 460 | 12 | 11 |

| COMPLEX SECTION TEST PIECE | | | | |
|---|---|---|---|---|
| time (sec.) | tension set (%) | | Shore hardness $A$ (%) | |
| | salts | vapor | salts | vapor |
| 10 | no curing | no curing | no curing | no curing |
| 20 | " | 35 | " | 35 |
| 60 | 30 | 18 | 27 | 46 |
| 90 | 20 | 19 | 45 | 48 |
| 120 | 19 | 19 | 47 | 50 |

After 60 seconds in the vapor, the test piece had a dry and non-tacky appearance; in the molten salts, the same appearance was obtained after 90 seconds.

EXAMPLE 8

A $C_2H_4/C_3H_6$/ethylidene norbornene (ENB) terpolymer (respectively 65.5%, 31%, 3.5%), known under the trade-mark Dutral TER 038, was used to prepare a mix having the following composition:

| | |
|---|---|
| elastomer EPDM | 100 parts by weight |
| carbon black FEF | 55 parts by weight |
| paraffin oil | 30 parts by weight |
| zinc oxide | 5 parts by weight |
| stearic acid | 1 parts by weight |
| tetramethyl thiuram monosulphide | 1.5 parts by weight |
| mercaptobenzothiazol | 0.75 parts by weight |
| sulphur | 1.5 parts by weight |

The mix was extruded and hot treated as is described in example 7.

The test pieces treated in the vapor were free from defects.

The results of the characterization tests carried out according to the same standards as in example 7 are reported hereinbelow.

| | RECTANGULAR SECTION TEST PIECE | | | | | |
|---|---|---|---|---|---|---|
| time | tensile stress ($Kg/cm^2$) | | elong. at break (%) | | tension set (%) | |
| (sec) | salts | vapor | salts | vapor | salts | vapor |
| 10 | no curing | 105 | no curing | 500 | no cur. | 18 |
| 20 | 100 | 165 | 480 | 320 | 16 | 10 |
| 65 | 160 | 160 | 350 | 350 | 11 | 10 |

| | COMPLEX SECTION TEST PIECE | | | |
|---|---|---|---|---|
| time | tension set (%) | | Shore hardness A | |
| (sec) | salts | vapor | salts | vapor |
| 10 | no curing | no curing | no curing | no curing |
| 20 | no curing | 22 | no curing | 27 |
| 60 | 25 | 16 | 30 | 48 |
| 90 | 17 | 16 | 49 | 47 |
| 120 | 16 | 17 | 51 | 46 |

EXAMPLE 9

O-rings (inside diameter=2.5 mm, thickness=3.5 mm) were molded from Tecnoflon ® FOR 65BI. The molding modalities were as follows: 190° C. for 4 minutes. Part of the O-rings underwent post-curing in oven at 250° C. for 24 hours; another part of the O-rings was heated for 2 hours in the same IVP apparatus as in example 3, containing a fluid having the same general formula indicated in example 3 but a distillation range of 220°–230° C., a viscosity of 4.6 cst at 20° C. and generating vapors at 225° C.; still another part of the O-rings was treated in the vapor of an analogous fluid but with a distillation range of 236°–245° C., which generated vapor at 240° C. The results, obtained according to standard ASTM D 1414, are reported in the following table.

| | after molding | after post-curing in vapor | | |
|---|---|---|---|---|
| | | 225° C. 2 hours | 240° C. 2 hours | 240° C. 4 hours |
| tensile stress (kg/cm²) | 80 | 105 | 107 | 110 |
| elong. at break (%) | 218 | 200 | 198 | 192 |
| modulus 100 (kg/cm²) | 41 | 48 | 49 | 52 |

-continued

EXAMPLES 10–15

Apparatus 1: (IVP ®) (U.K.) includes a stainless steel tub equipped, on the bottom, with electric heating elements and, in the upper portion of the tub, with cooling coils; furthermore it is equipped with a thermocouple for taking the temperatures and with a suction device for removing the volatilizing vapors; moreover it includes a secondary fluid injection system for removing the vapors of the primary fluid, and a movable truck for introducing the article to be cured into the primary vapor area.

This apparatus was used for the tests which utilized trichlorotrifluoroethane as a secondary fluid.

Apparatus 2: it is represented in FIG. 1 and consists of a glass structure, equipped with cooling coils but without a spray system for the secondary fluid; it was utilized for comparative tests characterized by the exclusive use of primary fluid.

Fluid 1 is a commercial-type perfluoropolyether GALDEN LS ® (Montedison) of formula:

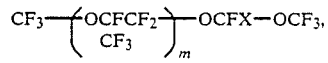

where X=F, $CF_3$ characterized by a viscosity of 2.50 cst at 20° C. and by a distillation range of 188°–192° C. (according to standard ASTM D 1078).

Fluid 2 is a commercial-type perfluoropolyether GALDEN LS 230 ®, having the same formula as indicated above and being characterized by a viscosity of 4.40 cst at 20° C. and a distillation range of 228°–233° C. (according to standard ASTM D 1074).

TEST 1

A circuit of type 1109 S, ESL ® U.K. was introduced into apparatus 1 described before. The apparatus was filled with 20 l of the perfluoropolyether described above, while the circuit was made of a Ag-filled phenolic resin. The resin was introduced into the trifluorotrichloroethane vapors (secondary fluid) at a speed of 5 cm/sec.

Various samples cross-linked in the perfluoropolyehtereal vapors for different times were prepared. The results are illustrated in Table 1.

The sample, once taken out from the primary fluid area, was left for 30 seconds in the secondary vapor area.

The test pieces of the conductive and resistive resins were pretreated at about 100° C. for various minutes in order to remove the solvents which may give rise to problems during the cross-linking step: just for this reason the values of resistance measured prior to cross-linking were not equal to one another.

The resistance values, as is known to those skilled in the art, were measured in Ohm/square by means of a high-accuracy digital multimeter.

TABLE 1 - RESIN A

|  | T °C. | Curing time minutes | Resistance prior to curing mΩ/□ | Resistance after curing mΩ/□ |
|---|---|---|---|---|
| FLUID 1 | 190 | 3 | 31,4 | 14,5 |
|  |  | 5 | 32,2 | 13,7 |
| FLUID 2 | 230 | 1 | 33,8 | 13,1 |

For comparative purposes, the same test was repeated in apparatus 2 and in furnace according to the optimum curing cycle proposed for the resin. The results are reported in Table 2.

TABLE 2

|  | T °C. | Curing time minutes | Resistance prior to curing mΩ/□ | Resistance after curing mΩ/□ |
|---|---|---|---|---|
| FLUID 1 | 190 | 1 | 33,38 | 20,12 |
|  |  | 3 | 34,28 | 17,96 |
|  |  | 5 | 30,92 | 16,51 |
| FLUID 2 | 230 | 1 | 33,06 | 17,27 |
|  |  | 3 | 33,70 | 19,80 |
|  |  | 5 | 32,90 | 21,60 |
|  |  | 10 | 34,00 | 21,10 |
| FURNACE | 150 | 120 | 34,0 | 32,4 |

From the above-reported results it is apparent that the cross-linking in oven leads to a very low resistance decrease, while good results in the reduction of resistance when using the vapor-phase cross-linking method were achieved by using the method with the primary fluid, and excellent results were obtained using the apparatus provided with primary fluid and secondary fluid.

TEST 2

Following the modalities described in test 1, a resistive resin (RS 15113 ESL ®) of the phenolic type filled with carbon was cross-linked. According to the specifications, a curing cycle in furnace at 150° C. for 2 hours should be optimum for this resin.

The results obtained by heating the perfluoropolyether fluid (of types 1 and 2) in the apparatus provided also with secondary fluid (1) are reported in Table 3.

TABLE 3

|  | T °C. | Curing time minutes | Resistance prior to curing KΩ/□ | Resistance after curing KΩ/□ |
|---|---|---|---|---|
| FLUID 1 | 190 | 3 | 9,11 | 0,62 |
|  |  | 5 | 8,38 | 0,60 |
| FLUID 2 | 230 | 1 | 7,7 | 0,43 |
|  |  | 3 | 11,6 | 0,43 |
|  |  | 10 | 11,8 | 0,56 |

Conversely, Table 4 shows the results obtained by using apparatus (2) and the ones obtained using a furnace.

TABLE 4

|  | T °C. | Curing time minutes | Resistance prior to curing KΩ/□ | Resistance after curing KΩ/□ |
|---|---|---|---|---|
| FLUID 1 | 190 | 3 | 9,67 | 0,56 |
|  |  | 5 | 8,58 | 0,49 |
|  |  | 10 | 7,41 | 0,45 |
| FLUID 2 | 230 | 1 | 18,50 | 0,44 |
|  |  | 3 | 14,80 | 0,39 |
|  |  | 6 | 15,00 | 0,49 |

TABLE 4-continued

|  | T °C. | Curing time minutes | Resistance prior to curing KΩ/□ | Resistance after curing KΩ/□ |
|---|---|---|---|---|
| FURNACE | 150 | 120 | 12,6 | 2,04 |

TEST 3

Following the modalities of the preceding tests, a series of tests were carried out on a resistive resin (X 2200 Coates ®) of the alkyl melaminic type filled with graphite. According to the recommended curing cycle, the resin after a 30-minute treatment at 140° C., should have had a nominal resistance of 33KΩ/□.

Table 5 shows the results of the tests carried out with perfluoropolyether fluids 1 and 2, including the trifluorotrichloroethane fluid as secondary fluid.

Table 6 shows the results obtained with the vapor-phase curing due to the primary fluids only and the curing obtained in furnace.

TABLE 5

|  | T °C. | Curing time minutes | Resistance prior to curing Ω/□ | Resistance after curing Ω/□ |
|---|---|---|---|---|
| FLUID 1 | 190 | 5 | 88,7 | 16,9 |
| FLUID 2 | 230 | 3 | 98,1 | 14,1 |

TABLE 6

|  | T °C. | Curing time minutes | Resistance prior to curing Ω/□ | Resistance after curing Ω/□ |
|---|---|---|---|---|
| FLUID 1 | 190 | 1 | 89,5 | 22,2 |
|  |  | 3 | 91,5 | 18,1 |
|  |  | 5 | 98,2 | 17,3 |
| FLUID 2 | 230 | 1 | 97 | 15,5 |
|  |  | 3 | 99 | 13,5 |
| FURNACE | 140 | 30 | 92,8 | 40,2 |
|  | 140 | 30 | 90,1 | 38,9 |

TEST 4

Following the modalities of the preceding tests, various tests for curing a resistive alkyd melaminic resin filled with graphite (DCI 0342 Coates ®) were carried out. According to the recommended curing cycle, the resin, after a 30-minute treatment at 140° C., should have had a nominal resistance of 100Ω/□.

Table 7 shows the results of the tests conducted in apparatus 1, wherein curing is carried out in the presence of trifluorotrichloroethane as a secondary fluid.

Table 8, conversely, shows the results obtained using apparatus 2 provided with one operating fluid only and the results obtained in furnace according to the recommended modalities.

TABLE 7

|  | T °C. | Curing time minutes | Resistance prior to curing Ω/□ | Resistance after curing Ω/□ |
|---|---|---|---|---|
| FLUID 1 | 190 | 3 | 394 | 49,8 |
|  |  | 5 | 400 | 47,2 |
| FLUID 2 | 230 | 1 | 404 | 43,6 |
|  |  | 3 | 405 | 41,1 |
|  |  | 5 | 399 | 39,8 |
|  |  | 10 | 412 | 39,5 |

TABLE 8

| T °C. | Curing time minutes | Resistance prior to curing Ω/□ | Resistance after curing Ω/□ |
|---|---|---|---|
| FLUID 1 190 | 1 | 409 | 65,0 |
|  | 3 | 411 | 50,8 |
|  | 5 | 424 | 48,3 |
| FLUID 2 230 | 1 | 446 | 44,3 |
|  | 3 | 402 | 40,0 |
|  | 5 | 399 | 39,0 |
|  | 10 | 432 | 38,2 |
| FURNACE 140 | 30 | 411 | 105,9 |
| 140 | 30 | 415 | 103,7 |

TEST 5

According to the modalities of the preceding tests, a conductive alkyl melaminic resin filled with silver (X 2201 Coates®) was cured with abovesaid perfluoropolyether fluids 1 and 2 in the vapor phase.

Table 9 shows the results of the tests carried out in apparatus 1 in the presence of trifluorotrichloroethane vapors as a secondary fluid.

Table 10 shows the results of the tests carried out without the secondary fluid. According to the suggested modalities, the 1-hour curing cycle at 140° C. should provide resins having a nominal resistance of 0.05Ω/□.

TABLE 9

| T °C. | Curing time minutes | Resistance prior to curing Ω/□ | Resistance after curing Ω/□ |
|---|---|---|---|
| FLUID 1 190 | 3 | 0,09 | 0,018 |
|  | 5 | 0,159 | 0,014 |
| FLUID 2 230 | 1 | 0,210 | 0,004 |
|  | 3 | 0,199 | 0,005 |
|  | 5 | 0,230 | 0,004 |
|  | 10 | 0,380 | 0,002 |

TABLE 10

| T °C. | Curing time minutes | Resistance prior to curing Ω/□ | Resistance after curing Ω/□ |
|---|---|---|---|
| FLUID 1 190 | 1 | 0,282 | 0,056 |
|  | 3 | 1,269 | 0,043 |
|  | 5 | 0,318 | 0,038 |
| FLUID 2 230 | 1 | 0,900 | 0,036 |
|  | 3 | 1,100 | 0,036 |
|  | 5 | 0,900 | 0,040 |
|  | 10 | 0,200 | 0,043 |

What we claim is:

1. A process for cross-linking thermosetting resins selected from the group consisting of epoxy resins, unsaturated polyester resins, urethanic resins, acrylic resins, phenolic resins and alkyd melaminic resins or hot curable elastomers selected from the group consisting of ethylene/propylene copolymer, ethylene/-propylene/diene terpolymer, vinylidene fluoride/hexafluoropropene copolymer and terpolymer $CH_2=CF_2/C_3F_6/C_2F_4$ or polymer thick films, carried out by heating the material or the article comprising the resin, the elastomer or the polymer thick film by means of a saturated vapor of a commercial-type perfluoropolyether selected from:

(1) $A'O(C_3F_6O)_m(CFXO)_n$—A, where X is equal to —F, —$CF_3$; A and A', like or different from each other, may be —$CF_3$, —$C_2F_5$, —$C_3F_7$; units $C_3F_6O$ and CFXO are statistically distributed along the perfluoropolyether chain, m and n are integers wherein n is O or the m/n ratio is equal to 2 when n is different from O;

(2) $C_3F_7O(C_3F_6O)_m$—B, wherein B is —$C_2F_5$ or $C_3F_7$, and m is a positive integer;

(3) $C_3F_7O(C_3F_6O)_m$—$CF(CF_3)$— 2, wherein m is a positive integer;

(4) $A'O(C_3F_6O)_m(C_2F_4O)_n(CFXO)_q$—$CF_3A$, wherein A and A', either the same or different from each other, are —$CF_3$, —$C_2F_5$ or —$C_3F_7$; X is —F, —$CF_3$; m, n and q are integers or zero;

(5) $CF_3O(C_2F_4O)_p(CF_2O)_q$—$CF_3$, wherein p and q are integers either like or different from each other, such that the p/q ratio ranges from 0.5 to 2;

(6) A—$(CF_2CF_2)_n$—A', wherein A and A', like or different from each other, are —$CF_3$ or —$C_2F_5$, and n is a positive integer;

(7) A—$(CXYCF_2CF_2)_m$—A', wherein A and A', like or different from each other, are —$CF_3$, —$C_2F_5$ or —$C_3F_7$; X and Y are H or P, either like or different from each other, and m is an integer;

(8)

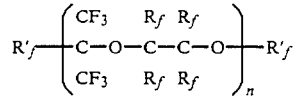

wherein R'$_f$ is a perfluoroalkyl, n is at least 8, and R$_f$ is F or a perfluoroalkyl;

said perfluoropolyether consisting of a mixture of chemically similar products, exhibiting a boiling range ≦12° C. determined by ASTM D. 1078 and having perfluoroalkyl end groups and an average boiling point from 120° C. to 270° C., corresponding to the temperature necessary for the cross-linking.

2. The process of claim 1, when utilized for curing epoxy resins additioned with a powdered metal.

3. The process of claim 1, carried out in the presence of a chlorofluoro-hydrocarbon secondary fluid.

4. The process of claim 3, wherein the secondary fluid is trichlorotrifluoroethane.

* * * * *